United States Patent
Hessong et al.

(10) Patent No.: US 9,154,860 B2
(45) Date of Patent: Oct. 6, 2015

(54) OPTICAL INTERCONNECTION ASSEMBLY FOR SPINE-AND-LEAF NETWORK SCALE OUT

(71) Applicant: CORNING OPTICAL COMMUNICATIONS LLC, Hickory, NC (US)

(72) Inventors: David Joseph Hessong, Hickory, NC (US); Sean Christopher Kelly, Hickory, NC (US); Brian Keith Rhoney, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 13 days.

(21) Appl. No.: 14/177,443

(22) Filed: Feb. 11, 2014

(65) Prior Publication Data
US 2015/0230007 A1  Aug. 13, 2015

(51) Int. Cl.
*H04J 14/00* (2006.01)
*H04Q 11/00* (2006.01)

(52) U.S. Cl.
CPC ....... *H04Q 11/0062* (2013.01); *H04Q 11/0005* (2013.01); *H04Q 2011/0096* (2013.01)

(58) Field of Classification Search
CPC .............. H04Q 11/0005; H04Q 2011/0039; H04Q 11/006; H04Q 2011/0052; H04Q 2011/0015; H04Q 11/0001; H04J 14/0238; H04L 2012/561; H04B 10/272; H04B 10/2503
USPC ................ 398/45, 49, 50, 51, 54, 56, 57
See application file for complete search history.

(56) References Cited

U.S. PATENT DOCUMENTS

| | | | | |
|---|---|---|---|---|
| 5,673,254 A | * | 9/1997 | Crayford | 370/231 |
| 6,335,992 B1 | * | 1/2002 | Bala et al. | 385/17 |
| 6,486,983 B1 | * | 11/2002 | Beshai et al. | 398/54 |
| 6,882,766 B1 | * | 4/2005 | Corbalis et al. | 385/17 |
| 7,389,046 B1 | * | 6/2008 | Tanaka et al. | 398/45 |
| 7,945,159 B2 | * | 5/2011 | Pape | 398/28 |
| 7,983,194 B1 | * | 7/2011 | Genetti et al. | 370/254 |
| 8,103,137 B2 | * | 1/2012 | Kirkpatrick et al. | 385/17 |
| 8,270,830 B2 | * | 9/2012 | Kirkpatrick et al. | 398/45 |
| 8,532,086 B1 | * | 9/2013 | Genetti et al. | 370/351 |
| 8,837,517 B2 | * | 9/2014 | Marr et al. | 370/463 |
| 8,983,291 B1 | * | 3/2015 | Broekaert et al. | 398/45 |
| 9,008,510 B1 | * | 4/2015 | Zhao et al. | 398/45 |
| 2008/0010807 A1 | | 1/2008 | Fujii et al. | 29/558 |
| 2008/0077647 A1 | | 3/2008 | Fam et al. | 708/625 |
| 2010/0254652 A1 | * | 10/2010 | Kirkpatrick et al. | 385/17 |
| 2010/0254703 A1 | * | 10/2010 | Kirkpatrick et al. | 398/45 |
| 2010/0265849 A1 | * | 10/2010 | Harel | 370/256 |
| 2013/0156425 A1 | * | 6/2013 | Kirkpatrick et al. | 398/45 |
| 2014/0169499 A1 | * | 6/2014 | Riani et al. | 375/298 |
| 2014/0169789 A1 | * | 6/2014 | Bhoja | 398/45 |
| 2014/0241205 A1 | * | 8/2014 | Virk et al. | 370/254 |

* cited by examiner

*Primary Examiner* — Hibret Woldekidan

(57) ABSTRACT

An optical interconnection assembly for a spine-and-leaf network is disclosed. The optical interconnection assembly has spine MF components and leaf MF components. The spine MF components are optically connected to spine MF components of spine switches via spine patch cords. The leaf MF components are optically connected to leaf MF components of leaf switches via leaf patch cords. An array of duplex fiber optic cables serves to optically connect every spine MF component to every leaf MF component so that every spine switch is optically connected to every leaf switch. The optical interconnection assembly facilitates network scale out without the multifiber connections having to be broken up into multiple duplex connections using duplex fiber optic cables.

18 Claims, 13 Drawing Sheets

OPTICAL INTERCONNECTION ASSEMBLY FOR SPINE-AND-LEAF NETWORK SCALE OUT

BACKGROUND

1. Field

The present disclosure relates to spine-and-leaf networks, and in particular relates to an optical interconnection assembly for spine-and-leaf network scale out, and further relates to spine-and-leaf networks that employ the optical interconnection assembly.

2. Technical Background

A data center is a location that houses computers and related telecommunications equipment and components for the purpose of processing (e.g., receiving, storing, managing and transmitting) data. Data centers often need to be expanded or "scaled out," wherein hardware is added to accommodate the increasing data-processing demands. It is thus desirable that the data-center hardware be configured in a manner that is scalable, i.e., that can support scale out of the hardware such that the data-processing performance of the data center improves in direct proportion to the added capacity.

Traditional data-center architectures have relied on a three-tier switching architecture whereby network reliability and scale-out capability is accomplished through switch redundancy. However, the three-tier switching architecture is not optimal for certain types of data centers, such as Internet data centers, that process relatively large amounts of data.

A more suitable network architecture for high-capacity data centers is called a "spine-and-leaf" (S/F) architecture, which flattens the network to reduce latency and redundancy. The S/F architecture utilizes leaf switches and spine switches, with every leaf switch connected to every spine switch to define a network mesh or network fabric. The ability to scale out the S/F network depends on the data rates employed, e.g., 10 GbE or 40 GbE. Presently, the spine-switch multi-fiber (MF) components and the leaf-switch MF components are predominately 40 GbE, so it would seem desirable to create a 40-GbE mesh. However, such a mesh limits the network's ability to be scaled out because the leaf switch used typically has only four 40-GbE uplink MF components to interface with the spine switch, which limits the network to four spine switches.

One approach to overcoming this type of scale-out limitation involves creating a 10-GbE mesh to allow for four times the amount of scale-out capability, i.e., sixteen 10-GbE MF components that allow for sixteen spine switches. This 10-GbE mesh can be created by using cabling in the form of LC duplex jumpers to break out each 40-GbE MF component into 4×10 GbE MF components to obtain the sixteen 10-GbE MF components. However, this creates cabling complexity while simultaneously counteracting the otherwise desirable high-density MTP connections.

SUMMARY

An optical interconnection assembly for optically connecting one or more spine switches to one or more leaf switches in a spine-and-leaf (S/F) network, comprising: an array of duplex fiber optic cables, wherein each of the duplex fiber optic cables has a first end and a second end, and wherein each duplex optical fiber cable forms a parallel channel having a data rate D; a plurality of $M_L$ of leaf MF components, wherein each of the leaf MF components optically connects to the first ends of certain ones of the duplex fiber optic cables, and wherein each leaf MF component provides $N_L$ parallel channels and a bandwidth $BW_L$; a plurality of $M_S$ of spine MF components, wherein each of the spine MF components optically connects to the second ends of certain ones of the duplex fiber optic cables, and wherein each spine MF component provides $N_S$ parallel channels and a bandwidth $BW_S$; wherein the array of duplex fiber optic cables connects every leaf MF component to every spine MF component to define the $N_S$ and $N_L$ parallel channels, and wherein $BW_S = N_S \cdot D$ and $BW_L = N_L \cdot D$ so that $N_S/N_L = M_L/M_S$.

Another aspect of the disclosure is a S/F network having scale-out capability that maintains multifiber connections. The S/F network includes: one or more spine switches that each have one or more spine MF components; one or more leaf switches, each having one or more leaf MF components; and at least one optical interconnection assembly having a first plurality of spine MF components optically connected to the one or more spine MF components via one or more spine patch cords and a second plurality of leaf MF components optically connected to the one or more leaf MF components via one or more leaf patch cords. The at least one optical interconnection assembly further comprises an array of duplex fiber optic cables that optically connect every spine MF component to every leaf MF component so that every spine switch is optically connected to every leaf switch via the optical interconnection assembly.

Another aspect of the disclosure is a method of forming a S/F network using a plurality of spine switches and a plurality of leaf switches. The method includes: providing at least one optical interconnection assembly having a plurality of $M_S$ spine MF components and a plurality of $M_L$ leaf MF components, wherein each spine MF component is optically connected to each leaf MF component via an array of duplex fiber optic cables; and optically connecting each of the plurality of spine switches to one or more of the spine MF components of the at least one optical interconnection assembly and optically connecting each of the plurality of leaf switches to one or more of the leaf MF components of the at least one optical interconnection assembly so that each leaf switch is optically connected to each spine switch through the at least one optical interconnection assembly.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description. The entire disclosure of any publication or patent document mentioned herein is incorporated by reference. The term "fiber" or "optical fiber" is used herein to mean single mode optical fiber or multimode optical fiber unless the context indicates otherwise which form fiber optic cables. The fiber optic cables may have multiple optical fibers, as a non-limited example, fiber optic cable may have two optical fibers to form a duplex fiber optic cable. The term "connector" is used herein to mean a device for terminating one or more optical fibers. The term "adapter" is used herein to mean a device that serves to operably connect two connectors. The term "multi-fiber component" is abbreviated as "MF component" and refers to an element or elements for connecting multiple fibers and can include, without limitation, any one or combination of connector, adapter, splice, receptacle, port, and the like, such that the fibers may be optically and operably connected. The term "harness" is used herein to mean an array of optical fibers or fiber optic cables.

Examplary Optical Interconnection Assembly

Figure 1:
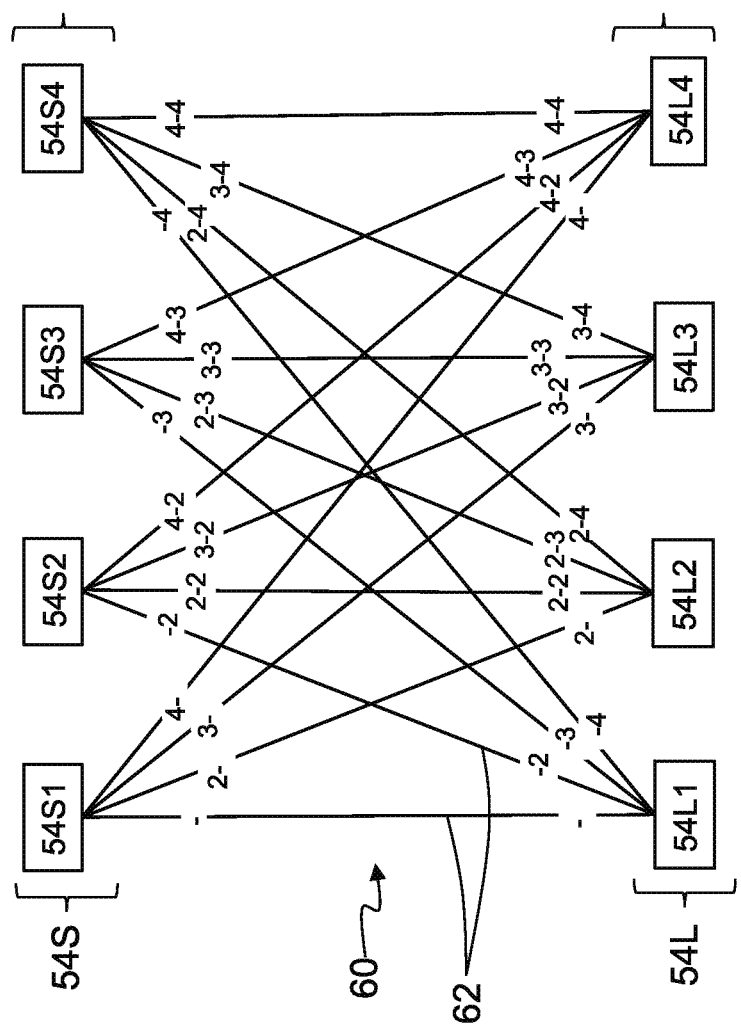
FIG. 1 is a schematic diagram of an examplary optical interconnection assembly according to the disclosure, showing an examplary harness or optical fiber array and the connections between the optical fibers and the spine and leaf multi-fiber components.

FIG. 1 is a schematic diagram of an examplary optical interconnection assembly 50 that includes a harness or optical fiber array 60 constituted by optical fibers 62. Optical fibers 62 connect certain spine-side MF components 54S and leaf-side MF components 54L as denoted by the numbers 1-1, 1-2, etc. located on each of the optical fibers and as set forth in Table 1, below. Spine-and-leaf networks that utilize the example leaf-spine harness connections as shown in FIG. 1 and as set forth in Table 1 are discussed below.

The optical interconnection assembly 50 of FIG. 1 has four spine-side MF components 54S and these are denoted 54S1 through 54S4. Likewise, there are four leaf-side MF components 54L and these are denoted 54L1 through 54L4.

TABLE 1

LEAF-SPINE HARNESS CONNECTIONS (FIG. 1)

| LEAF MF COMPONENT | LEAF CONNECTION | SPINE CONNECTION | SPINE MF COMPONENT |
|---|---|---|---|
| 54L1 | 1-1 | 1-1 | 54S1 |
|  | 1-2 | 2-1 |  |
|  | 1-3 | 3-1 |  |
|  | 1-4 | 4-1 |  |
| 54L2 | 2-1 | 1-2 | 54S2 |
|  | 2-2 | 2-2 |  |
|  | 2-3 | 3-2 |  |
|  | 2-4 | 4-2 |  |
| 54L3 | 3-1 | 1-3 | 54S3 |
|  | 3-2 | 2-3 |  |
|  | 3-3 | 3-3 |  |
|  | 3-4 | 4-3 |  |
| 54L4 | 4-1 | 1-4 | 54S4 |
|  | 4-2 | 2-4 |  |
|  | 4-3 | 3-4 |  |
|  | 4-4 | 4-4 |  |

Figure 2:
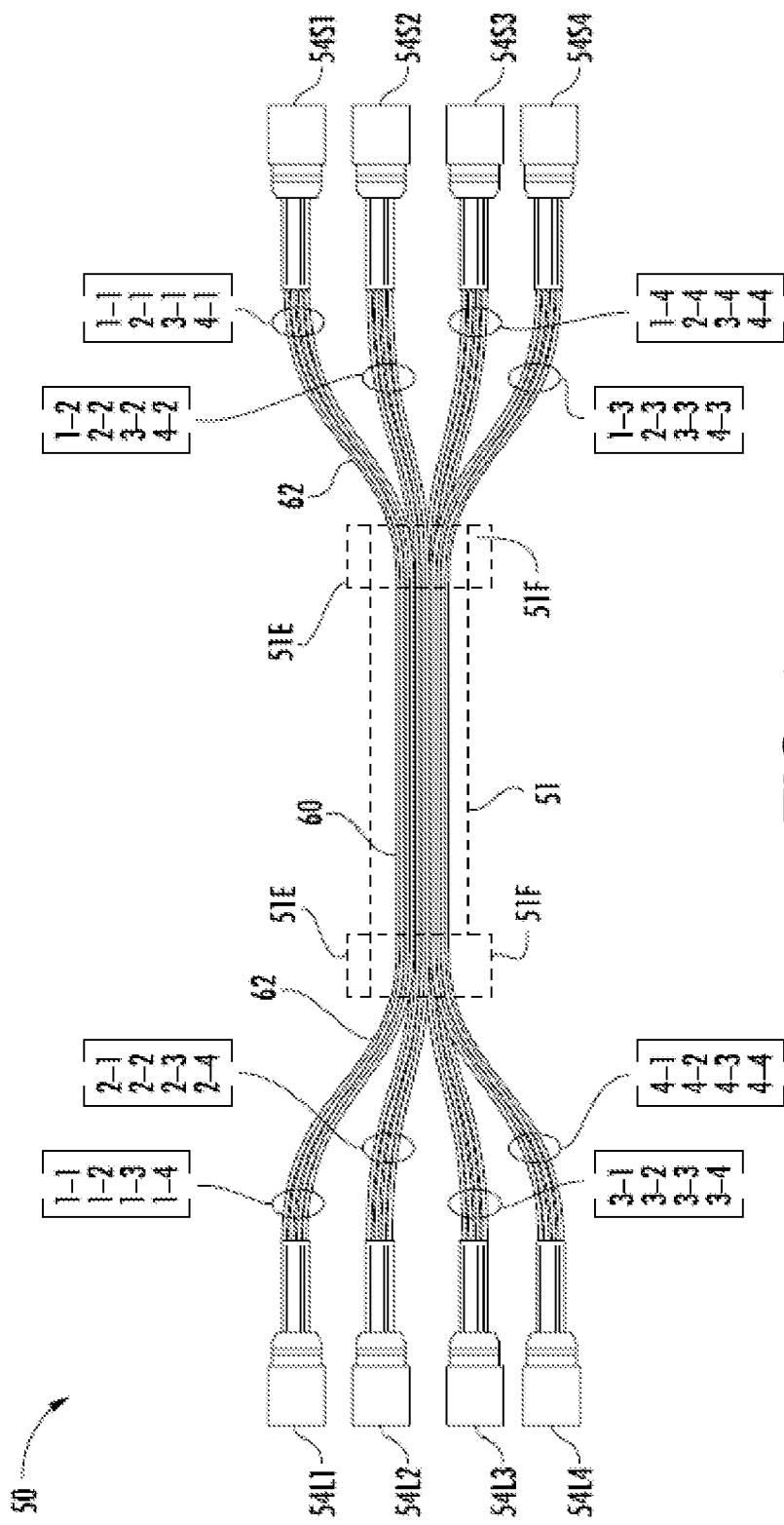
FIG. 2 is a schematic diagram of an examplary optical interconnection assembly that has a cable configuration.

FIG. 2 is schematic diagram of an examplary optical interconnection assembly 50 that has a cable configuration. The optical interconnection assembly 50 of FIG. 2 includes an optional protective cover or jacket 51 that covers a portion of harness or optical fiber array 60. The protective cover or jacket 51 has ends 51E terminated by respective furcations 51F where select optical fibers 62 branch out to select spine and leaf MF components 54S and 54L according to the configuration shown in FIG. 1 and set forth above in Table 1.

Exemplary S/F Network with 4×4 Scale Out

Figure 3:
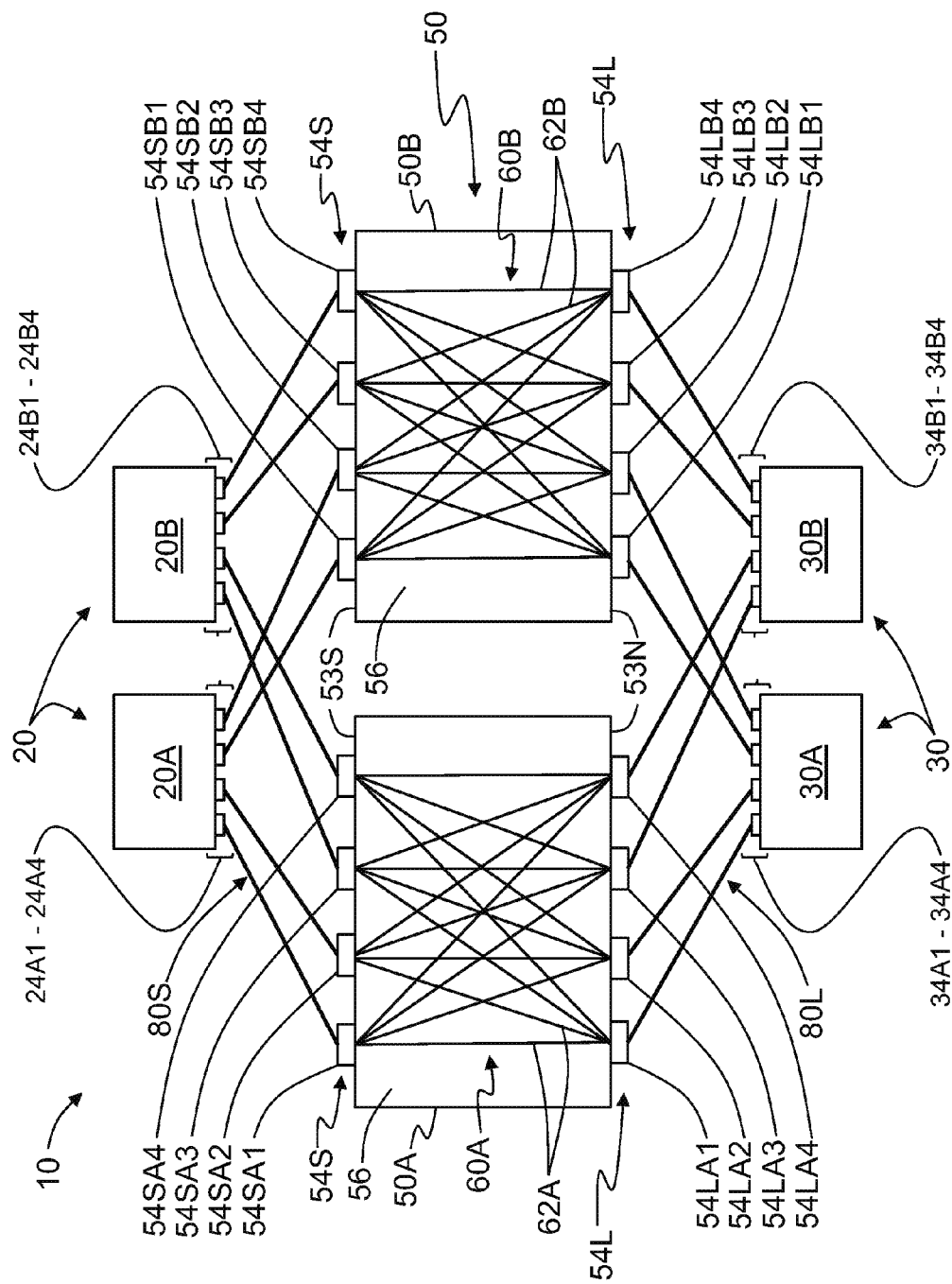
FIG. 3 is a schematic diagram of an examplary S/F network that includes two spine switches and two leaf switches optically connected via two optical fiber interconnection assemblies in a 4×4 scale-out configuration.

FIG. 3 is a schematic diagram of an examplary spine-and-leaf (S/F) network 10 that includes two spine switches 20 (20A and 20B) and two leaf switches 30 (30A and 30B) in a 4×4 scale-out configuration. Each spine switch 20 has spine MF components 24, while each leaf switch has leaf MF components 34. In the present example, each spine switch 20 has four spine MF components 24, namely, spine MF components 24A1 through 24A4 for spine switch 20A and spine MF components 24B1 through 24B4 for spine switch 20B. Likewise, each leaf switch 30 has four leaf MF components 34, namely, leaf MF components 34A1 through 34A4 for leaf switch 30A, and leaf MF components 34B1 through 34B4 for leaf switch 30B. Each of the spine MF components 24 and each of the leaf MF components 34 are 40 GbE parallel optic MF components. Thus, all spine switches 20 (i.e., 20A and 20B) and all leaf switches 30 (i.e., 30A and 30B) in the S/F network 10 of FIG. 3 have multiple 40 GbE MF components.

In the S/F network 10 of FIG. 3, spine switches 20 and leaf switches 30 are connected through two optical interconnection assemblies 50 (50A and 50B). Example S/F networks 10 can have tens, hundreds or thousands of optical interconnection assemblies 50. Also, S/F network 10 can have tens of spine switches 20, with each of the spine switches having hundreds of spine MF components 24. Moreover, spine switches 20 can be meshed with hundreds, or thousands, of leaf switches 30 that each has tens of leaf MF components 34. Likewise, S/F networks 10 may utilize tens, hundreds or even thousands of optical interconnection assemblies 50 to create the required mesh. Thus, the various examples of S/F network 10 such as those shown in FIG. 3 and in the other Figures are simplified representations for ease of illustration and discussion.

Figure 4:
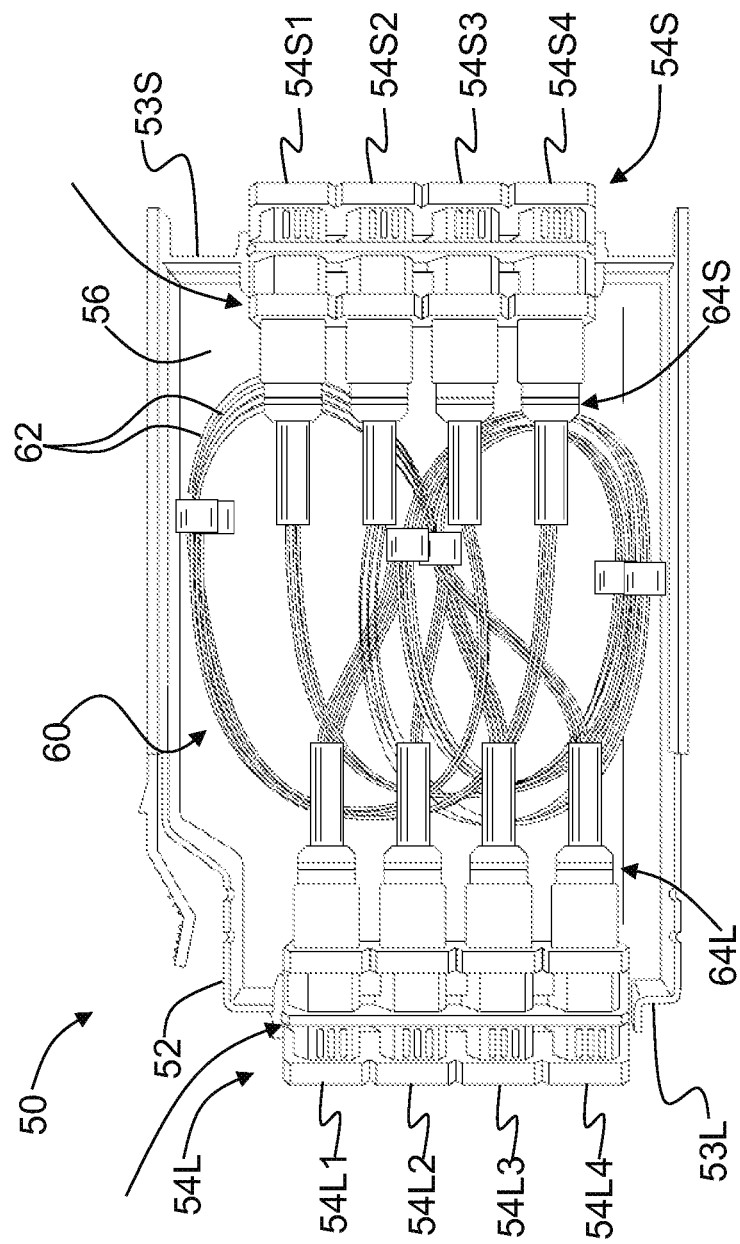
FIG. 4 is a top-down view of an examplary optical interconnection assembly having a 4×4 configuration positioned in a module.

FIG. 4 is a top-down view of an examplary optical interconnection assembly 50 that has a housing 52 that includes a first side (spine side) 53S, a second side (leaf side) 53L, and an interior 56. The spine-side MF components 54S are supported on spine-side 53S of housing 52, while leaf-side MF components 54L are supported on leaf side 53L of the housing. Optical fiber array 60 includes connectors 64S and 64L that terminate opposite ends of one or more optical fibers 62, such as four optical fibers. In an example embodiment, MF components 54S and 54L may include connectors 64S and 64L and respective adapters 66S and 66L that respectively receive connectors 64S and 64L of harness 60.

In FIG. 4, spine-side MF components 54S and leaf-side MF components 54L are multi-fiber parallel optic MF components, e.g., MTP MF components, which may include multifiber push-on (MPO) connectors, e.g., MTP connectors, and multifiber adapters, and may be configured to connect with other multifiber push-on (MPO) connectors, e.g., MTP connectors. In the present example, spine-side MF components 54S and leaf-side MF components 54L are eight-fiber (8f) MF components. There are four spine-side MF components 54S for each optical interconnection assembly 50, and these are denoted 54SA1 through 54SA4 for optical interconnection assembly 50A and 54SB1 through 54SB4 for optical interconnection assembly 50B. Likewise, there are four leaf-side MF components 54L for each optical interconnection assembly 50, and these are denoted 54LA1 through 54LA4 for optical interconnection assembly 50A and 54LB1 through 54LB4 for optical interconnection assembly 50B. Thus, in S/F network 10 in FIGS. 3 and 4, the optical interconnection assemblies 50 are "4×4."

Each optical interconnection assembly 50 includes the aforementioned harness or fiber optic array 60 (60A, 60B) composed of two-fiber (2f) cables 62 (62A, 62B), which are also called "duplex fiber optic cables" or "duplex cables" or "duplex fiber pairs." In FIG. 4, fiber optic array 60 is shown contained within housing interior 56. The 2f cables 62 of fiber optic array 60 are configured to connect each spine-side MF component 54S to each leaf-side MF component 54L. This means that each 8f MF component 54S and 54L is connected to four 2f cables 62. Further, in the present example, each 2f cable 62 is a 10 GbE link, and MF components 54S and 54L are 40 GbE (4×10 GbE) parallel optic MF components. In the present example, there are two optical interconnection assemblies 50A and 50B that respectively include fiber optic arrays 60A and 60B, which respectively comprise 2f fiber cables 62A and 62B.

With reference again to FIG. 3, spine MF components 24A and 24B of spine switches 20A and 20B, respectively, are optically connected to spine-side MF components 54SA and 54SB of optical interconnection assemblies 50A and 50B via fiber optic cables 80S (i.e., 80SA and 80SB) while leaf MF components 34A and 34B of leaf switches 30A and 30B are optically connected to leaf-side MF components 54LA and 54LB of the optical interconnection assemblies via fiber optic cables 80L (i.e., 80LA and 80LB). The fiber optic cables 80S and 80L are usually relatively short and so are referred to hereinafter as "patch cords," as the term is used in the industry (the term "jumpers" is also used in the industry). In the present example, patch cords 80S and 80L are each 40 GbE.

S/F network 10 may be considered to be fully meshed at 40 GbE, when at least one spine MF component 24 of each spine switch 20 connects to at least one each leaf MF component 34 of each leaf switch 30. That is to say, each spine switch 20 is connected to each leaf switch 30. The configuration of fiber optic array 60 (also called a "harness") in each optical interconnection assembly 50 defines a mesh that serves to connect at least one spine MF component 24 to at least one leaf MF component 34 in a manner that makes S/F network 10 amenable to scale out without the patch-cord cabling having to be reduced to 10 GbE and without the attendant cabling complexity.

Figure 5A:
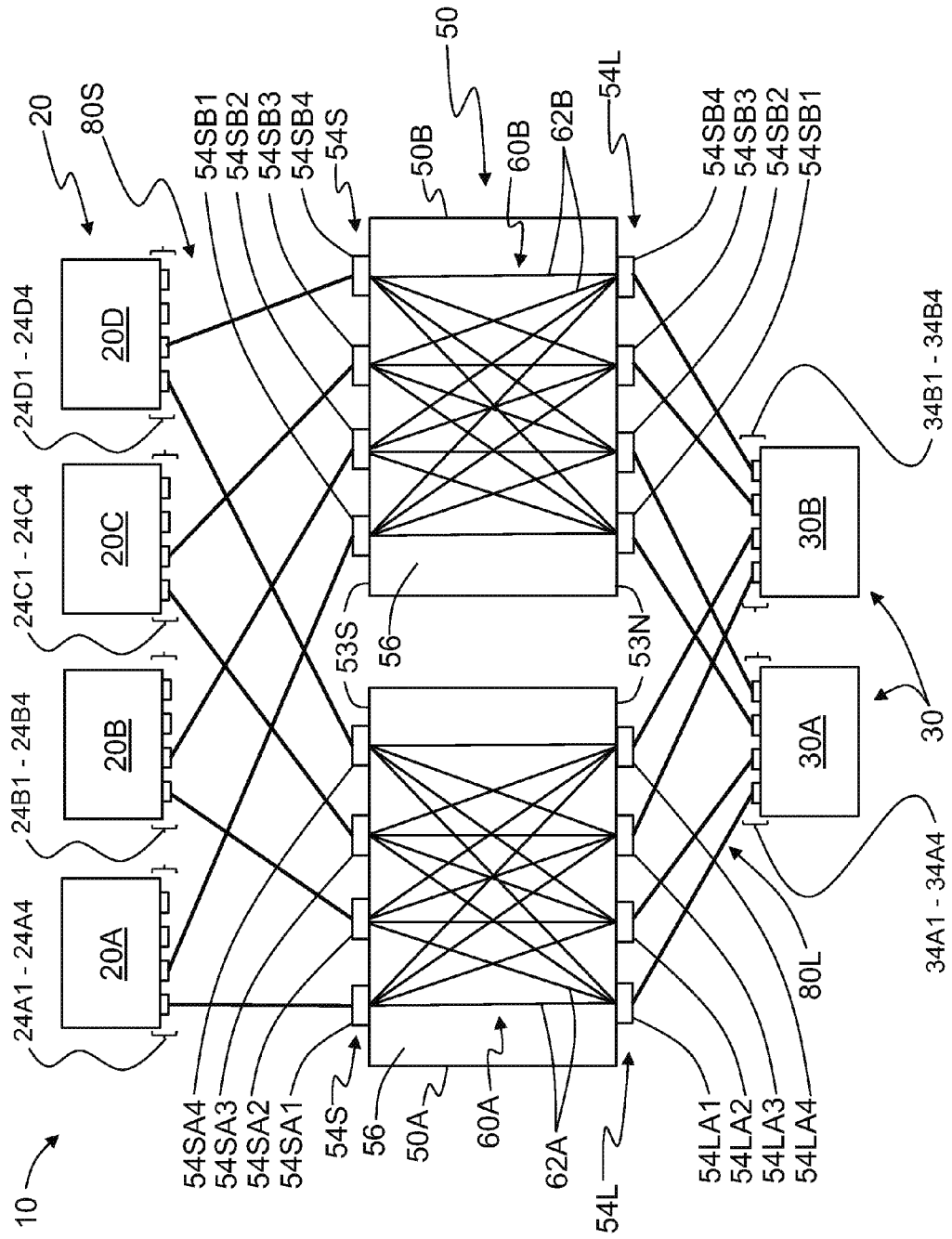
FIG. 5A is similar to FIG. 3 and shows the S/F network of FIG. 3 as scaled out to include two additional spine switches.

FIG. 5A is similar to FIG. 3 and shows an S/F network 10 of FIG. 3 as scaled-out to include two additional spine switches 20, denoted 20C and 20D. The addition of spine switches 20C and 20D does not require that the configuration of leaf patch cords 80L to be changed. Instead, spine patch cords 80S are adjusted as shown so that each spine switch 20 is connected to each leaf switch 30 via the two optical interconnection assemblies 50.

Figure 5B:
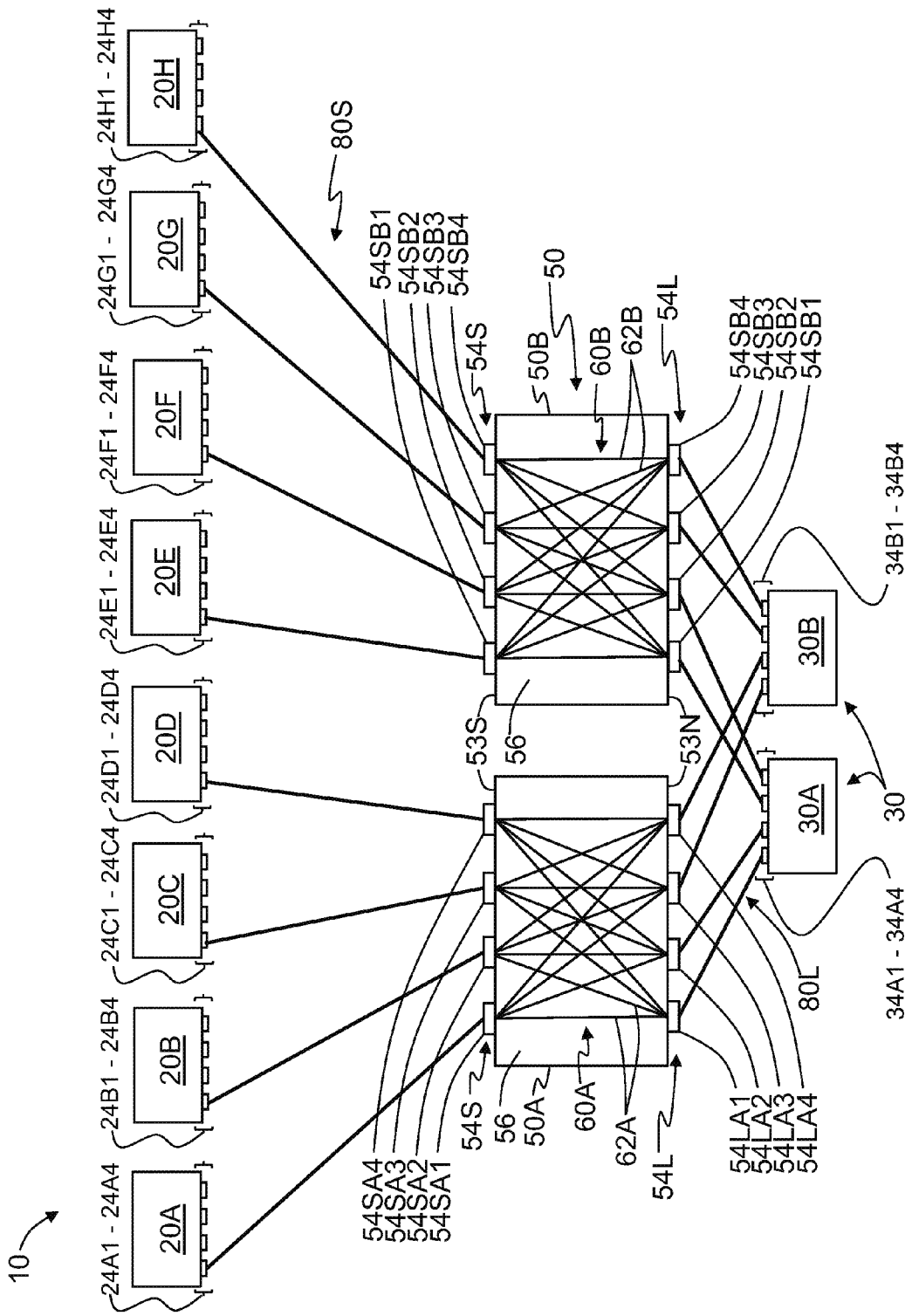
FIG. 5B is similar to FIG. 5A and shows the S/F network of FIG. 5A is scaled out to include a total of eight spine switches that connect to two leaf switches through two optical interconnection assemblies.

FIG. 5B is similar to FIG. 5A and shows the example S/F network 10 of FIG. 5A is scaled out to include a total of eight spine switches 20, i.e., switches 20A through 20H, with one MF component 24 of each spine switch connected to one spine-side MF component 54S of one of the two optical interconnection assembly 50, as shown.

To accomplish the scale out of S/F network 10 of FIG. 5B, more spine patch cords 80S may be added to connect the added spine switches 20E through 20H to spine-side MF components 54S of optical interconnection assemblies 50. This frees up some spine MF components 24 on switches 20A through 20D, allowing connectivity from additional leaf MF components 34.

Figure 6:
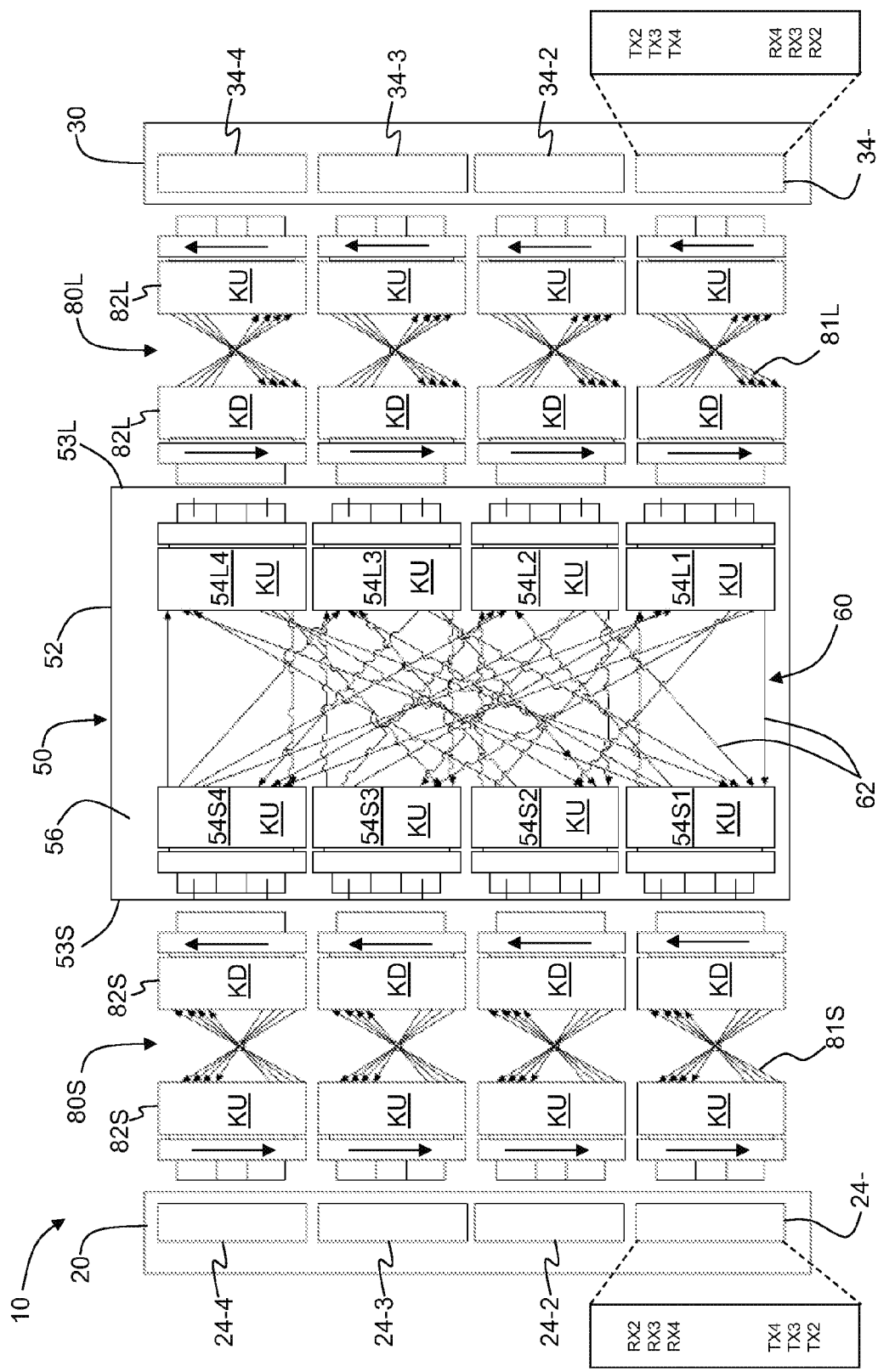
FIG. 6 is a schematic diagram of an examplary S/F network that has a single spine switch optically connected to a single leaf switch via a single optical interconnection assembly.

FIG. 6 is a schematic diagram of an example S/F network 10 that shows a single optical interconnection assembly 50 connecting a single spine switch 20 to a single leaf switch 30. The optical interconnection assembly 50 may include a module. Spine-side MF components 54S (54SA1 through 54S3) and leaf-side MF components 54L (54L1 through 54L4) may comprise MTP connectors. Also, example spine-side patch cords 80S and leaf-side patch cords 80L are shown as respectively including optical fibers 81S and 81L that terminate at their respective ends with MTP connectors 82S and 82L. The symbol "KU" stands for a "key up" orientation for the given MTP connector, while the symbol "KD" stands for a "key down" orientation. In an example, MTP connectors 82S and 82L are MTP connectors that are plugged into MF components in the form of quad-small-form-factor-pluggable (QSFP) transceivers on spine switches 20 and leaf switches 30.

Individual transmit and receive channels TX and RX for spine MF components 24 (i.e., 24-1 through 24-4) and the leaf MF components 34 (i.e., 34-1 through 34-4) are also shown in respective close-up insets, with "XX" denoting a closed channel. The following eight industry-standard color codes are used in FIG. 6: {B, O, G, Br, Y, V, Ro, A}={Blue, Orange, Green, Brown, Yellow, Violet, Rose and Aqua}. The other four colors of the standard twelve color codes (Slate, White, Red, Black) are not required because the various MF components have only eight fibers, or four duplex channels. The order of the color-coding scheme {B, O, G, Br, Y, V, Ro, A} for patch cords 80S and 80L is indicated in FIG. 4 by the shorthand notation "B→A" for ease of illustration.

Examplary S/F Network with 4×12 Scale Out

Figure 7:
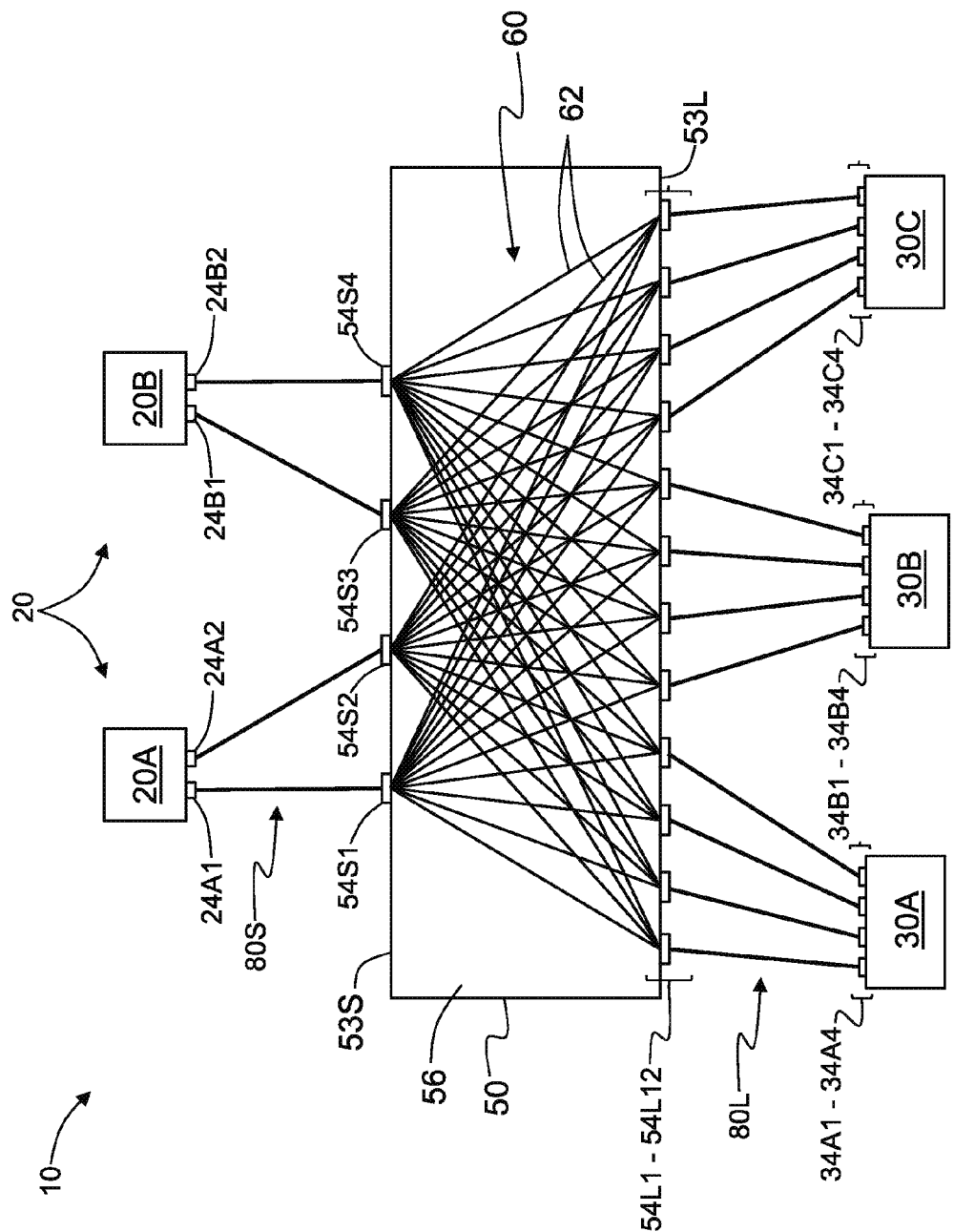
FIG. 7 is a schematic diagram of an examplary S/F network that includes two spine switches, three leaf switches and a single optical interconnection assembly in a 4×12 scale-out configuration.

FIG. 7 is similar to FIG. 3 and illustrates an exemplary S/F network 10 that includes two spine switches 20 (20A and 20B) and three leaf switches 30 (30A through 30C) in a 4×12 scale-out configuration that employs a single optical interface assembly 50. The spine switches 20A and 20B each have two spine MF components 24 of 120 GbE (each MF component being a 12×10 GbE parallel optic configuration), namely, 24A1, 24A2 and 24B1, 24B2. The leaf switches 30A through 30C each have four leaf MF components 34 of 40 GbE (4×40 GbE), namely, 34A1-34A4, 34B1-34B4 and 34C1-34C4. The 120 GbE (12×10 GbE parallel optic) spine MF components 24 may have twenty-four fibers, i.e., are 24f MF components, while the 40 GbE (4×10 GbE parallel optic) leaf MF components 34 are 8f MF components.

Figure 8:
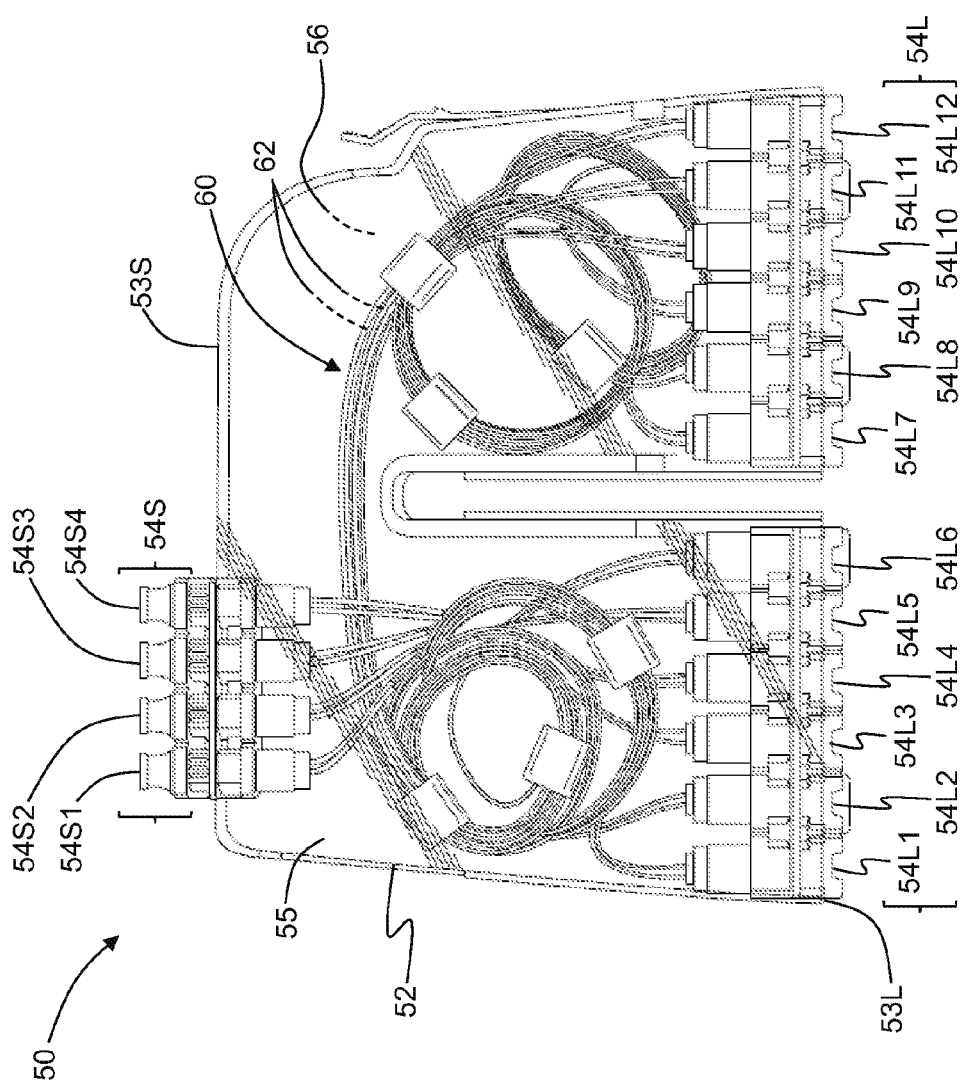
FIG. 8 is a top-down view of an examplary optical interconnection assembly having a 4×12 configuration positioned in a module.

The optical interface assembly 50 includes four spine-side 24f MF components 54S (54S1-54S4) of 120 GbE and twelve leaf-side 8f MF components 54L (54L1-54L12) of 40 GbE. Every spine-side MF component 54S is connected to every leaf-side MF component 54L via fiber optic array 60 of 2f cables 62, which have a data rate of 10 GbE. The spine MF components 24 of spine switches 20A and 20B are optically connected to spine-side MF components 54S of optical interconnection assembly 50 using 24f patch cords 80S. The leaf MF components 34 of leaf switches 30A through 30C are optically connected to leaf-side MF components 54L of optical interconnection assembly 50 using 8f or 12f patch cords 80L. FIG. 8 is a top-down view of an example 4×12 modular optical interconnection assembly 50. Housing 52 is shown in FIG. 6 as having a transparent top 57. It is noted here that the 8f MF components referred to herein can be formed from 12f MF components by blocking four of the fiber positions, e.g., with short sections of dummy fiber.

Figure 9:
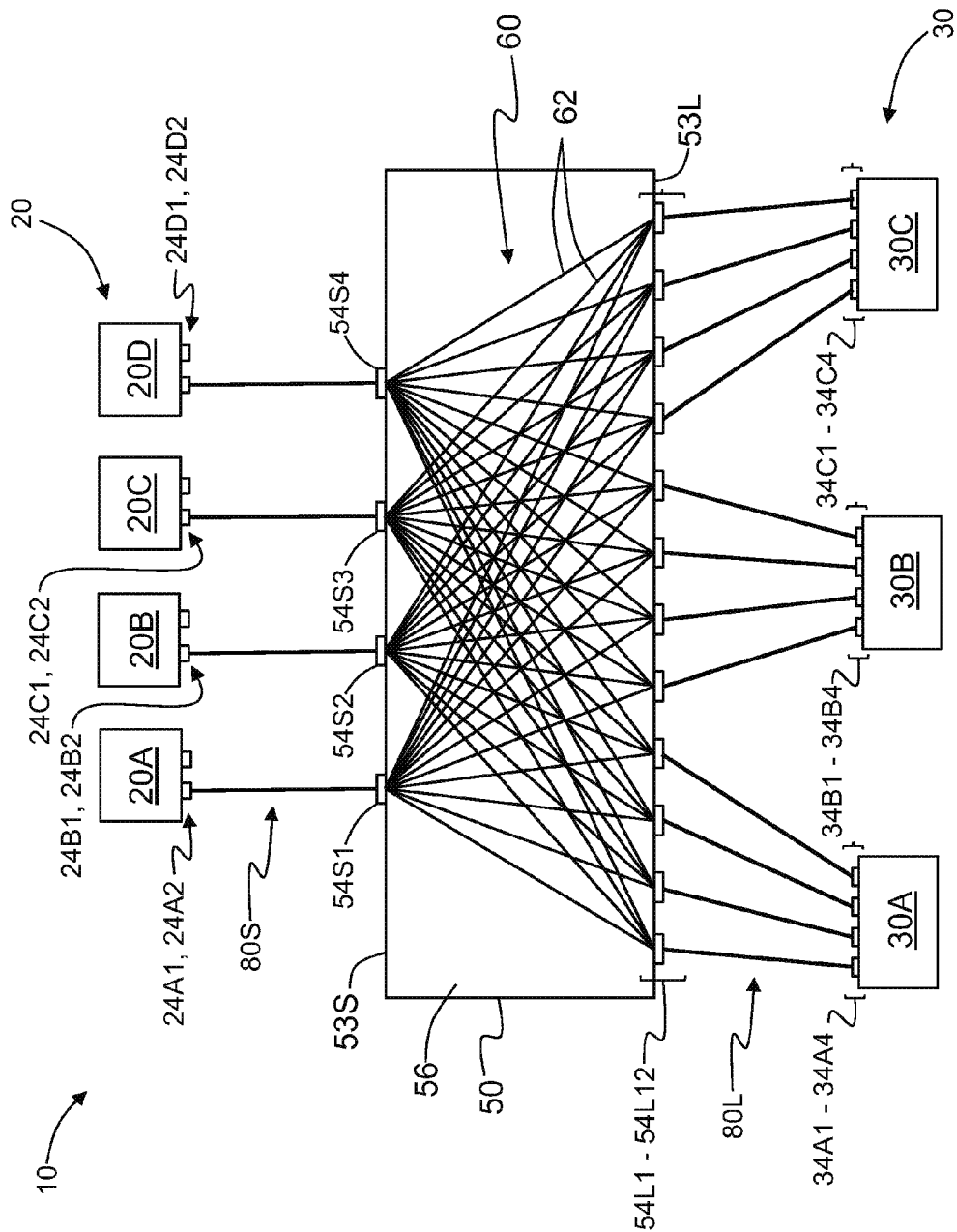
FIG. 9 is similar to FIG. 7 and shows the S/F network of FIG. 7 as scaled out to include a total of four spine switches.

FIG. 9 is similar to FIG. 7 and shows an example of the S/F network 10 of FIG. 7 as scaled out to include a total of four spine switches 20, namely 20A through 20D. As new spine switches 20C and 20D are added, patch cords 80S are adjusted accordingly so that each spine switch 20 is connected to each leaf switch 30.

Figure 10A:
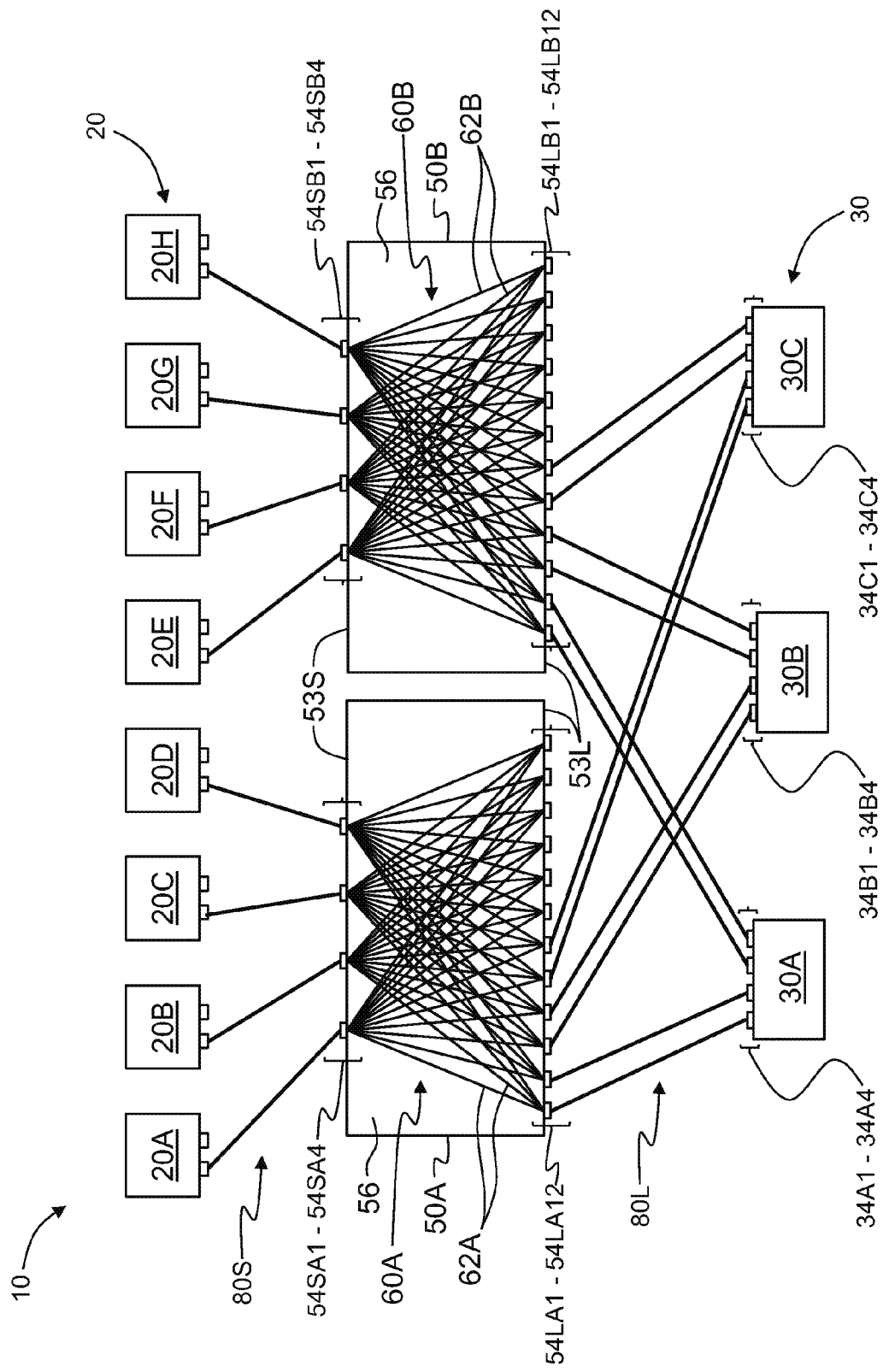
FIG. 10A is similar to FIG. 9 and shows the S/F network of FIG. 9 as scaled out to include a total of eight spine switches and two optical interconnection assemblies.

FIG. 10A is similar to FIG. 9 and shows an example of the S/F network 10 of FIG. 9 as scaled out to include eight spine switches 20A through 20H, which requires adding a second optical interconnection assembly 50 so that there are now two optical interconnection assemblies 50A and 50B. The two optical interconnection assemblies 50A and 50B are required when 6 or 8 spine switches 20 are used. To scale of the configuration of S/F network 10 of FIG. 9 to obtain the S/F network configuration of FIG. 10A, patch cords 80S and 80L need to be adjusted to establish connections to both optical interconnection assemblies 50A and 50B, as shown.

Figure 10B:
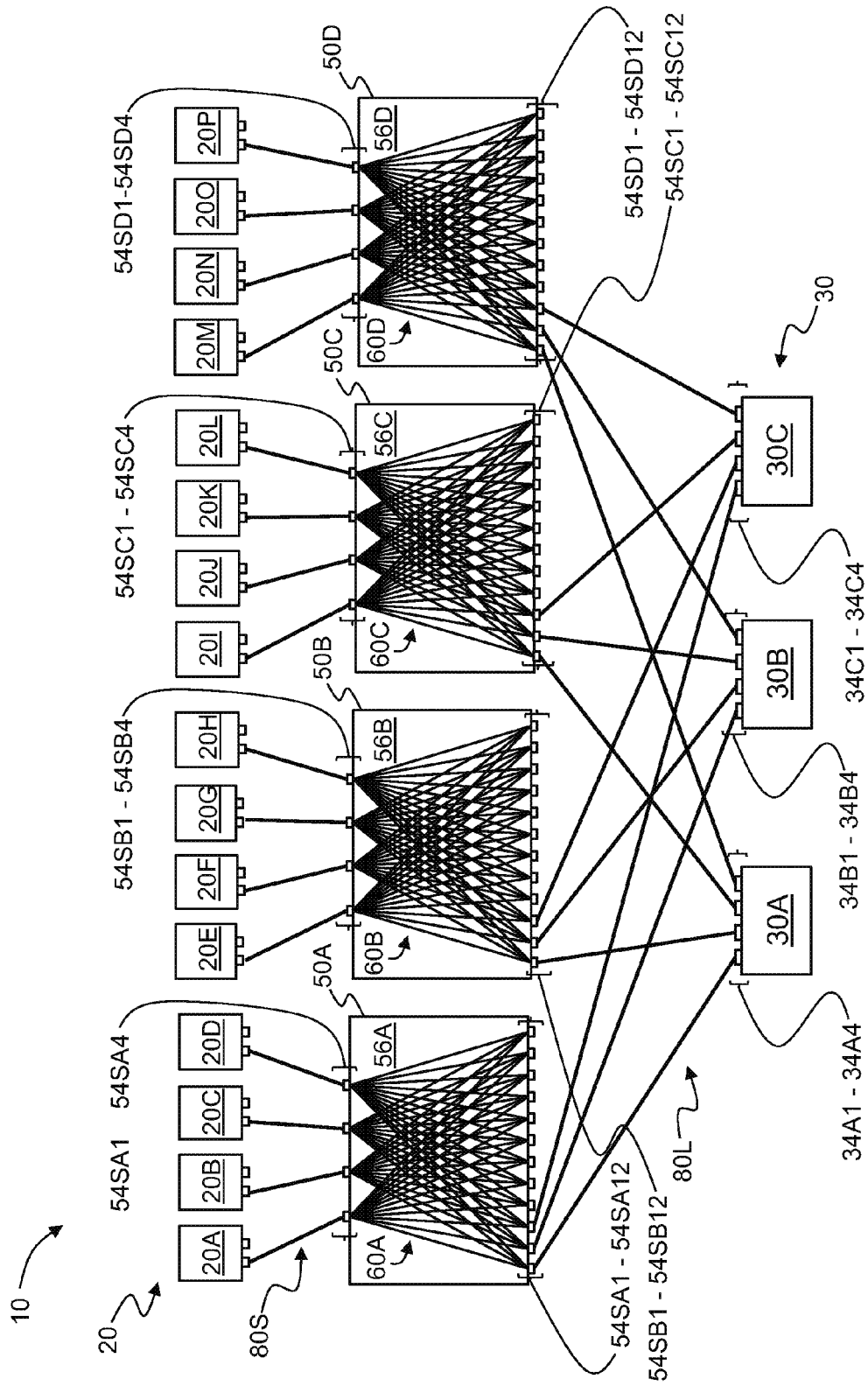
FIG. 10B is similar to FIG. 10B and shows the S/F network of FIG. 10A as scaled out to include a total of sixteen spine switches and four optical interconnection assemblies.

FIG. 10B is similar to FIG. 10A and shows an example of S/F network 10 that illustrates the maximum scale out (when considering a leaf switch 30 with 4×40 GbE uplink MF components 34) for the 10 GbE mesh having sixteen spine switches 20A through 20P and four optical interconnection assemblies 50A through 50D. In all the 4×12 scale-out embodiments, all that is required for scale out is adjusting either spine patch cords 80S or both spine and leaf patch cords 80S and 80L. There is no need to break out the connections into duplex fibers and LC connectors to obtain the required connectivity between spine switches 20 and leaf switches 30.

Generalized Optical Interconnection Assembly

Figure 11:
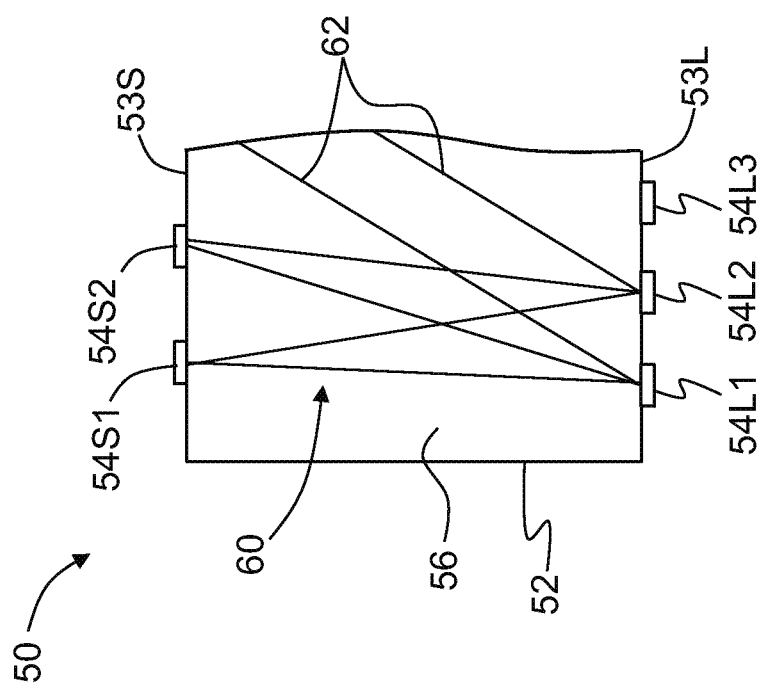
FIG. 11 is a cut-away view of a generalized optical interconnection assembly.

FIG. 11 is a cut-away view of a generalized optical interconnection assembly 50. As described above, optical interconnection assembly 50 resides in S/F network 10 between spine switches 20 and leaf switches 30 and serves to optically interface MF components 24 of the spine switches and MF components 34 of the leaf switches. The optical interconnection assembly 50 has a number $M_S$ of spine-side MF components 54S and a number $M_L$ of leaf-side MF components 54L. The bandwidth of each spine-side MF component 54S is $BW_S$, while the bandwidth of each leaf-side MF component 54L is $BW_L$.

The spine-side MF component bandwidth $BW_S$ is related to the number $N_S$ of parallel channels (2f cables 62) at each spine-side MF component 54S and to the data rate D carried by each of the 2f cables by the relationship $BW_S = N_S \cdot D$. Likewise, the leaf-side MF component bandwidth $BW_L$ is related to the number $N_L$ of parallel channels (2f cables 62) at each leaf-side MF component 54L and to the data rate D carried by each of the 2f cables by the relationship $BW_L = N_L \cdot D$.

The spine-side MF components 54S and the leaf-side MF components 54L of optical interconnection assembly 50 are related by the equation $$M_S \cdot BW_S = M_L \cdot BW_L. \qquad (1)$$

Substituting for $BW_S$ and $BW_L$ in equation (1) using the above relationship for these terms yields the following relationship:

$$M_S \cdot N_S \cdot D = M_L \cdot N_L \cdot D. \qquad (2)$$

Equation (2) can be simplified into the following relationship:

$$N_S / N_L = M_L / M_S \qquad (3)$$

Equation (3) represents the basic relationship between the number MS of spine-side MF components 54S, the number ML of leaf-side MF components 54L, and the respective number $N_S$ and $N_L$ of 2f cables 62 at each of the spine-side and leaf-side MF components. One or more optical interconnection assemblies 50 that are configured according to equation (3) can be used to scale out the corresponding S/F network 10.

Table 2 below sets forth three example configurations for optical interconnection assembly 50 based on equation (3).

TABLE 2

Example optical interconnection assembly configurations

| CONFIGURATION | $N_S$ | $N_L$ | $M_L$ | $M_S$ |
|---|---|---|---|---|
| EXAMPLE 1 | | | | |
| 40 GbE (4 × 10 GbE) spine-side MF components | 4 | 4 | 4 | 4 |
| 40 GbE (4 × 10 GbE) leaf-side MF components | | | | |
| BWs = 40 GbE (4 × 10 GbE) | | | | |
| BWL= 40 GbE (4 × 10 GbE) with D = 10 GbE | | | | |
| EXAMPLE 2 | | | | |
| 120 GbE (12 × 10 GbE) spine-side MF components | 12 | 4 | 12 | 4 |
| 40 GbE (4 × 10 GbE) leaf-side MF components | | | | |
| BWs =120 GbE (12 × 10 GbE) | | | | |
| BWL= 40 GbE (4 × 10 GbE) with D = 10 GbE | | | | |
| EXAMPLE 3 | | | | |
| 400 GbE (16 × 25 GbE) spine-side MF components | 16 | 4 | 16 | 4 |
| 100 GbE (4 × 25 GbE) leaf-side MF components | | | | |
| BWs = 400 GbE (16 × 25 GbE) | | | | |
| BWL= 100 GbE (4 × 25 GbE) with D = 25 GbE | | | | |

Thus, three different example configurations for optical interconnection assembly 50 have the following relationships, respectively: 1) $BW_S = BW_L$ and $N_S = N_L$; 2) $BW_S = 3 \cdot BW_L$ and $N_S = 3 \cdot N_L$; and 3) $BW_S = 3 \cdot BW_L$ and $N_S = 4 \cdot N_L$.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An optical interconnection assembly for optically connecting one or more spine switches to one or more leaf switches in a spine-and-leaf (S/F) network, comprising:
   an array of duplex fiber optic cables, wherein each of the duplex fiber optic cables has a first end and a second end, and wherein each duplex optical fiber cable forms a parallel channel having a data rate D;
   a plurality of $M_L$ of leaf multi-fiber (MF) components, wherein each of the leaf MF components optically connects to the first ends of certain ones of the duplex fiber optic cables, and wherein each leaf MF component provides $N_L$ parallel channels and a bandwidth $BW_L$;
   a plurality of $M_S$ of spine MF components, wherein each of the spine MF components optically connects to the second ends of certain ones of the duplex fiber optic cables, and wherein each spine MF component provides $N_S$ parallel channels and a bandwidth $BW_S$; and
   wherein the array of duplex fiber optic cables connects every leaf MF component to every spine MF component to define the $N_S$ and $N_L$ parallel channels, and wherein $BW_S = N_S \cdot D$ and $BW_L = N_L \cdot D$ so that $N_S/N_L = M_L/M_S$.

2. The optical interconnection assembly according to claim 1, wherein $M_S \cdot BW_S = M_L \cdot BW_L$.

3. The optical interconnection assembly according to claim 1, further including a housing having an interior that contains the array of duplex fiber optic cables.

4. The optical interconnection assembly according to claim 3, wherein the housing comprises a modular housing having a first side that supports the plurality of spine MF components and a second side that supports the plurality of leaf MF components.

5. The optical interconnection assembly according to claim 1, wherein each of the spine MF components has a first data rate and wherein each of the leaf MF components has a second data rate.

6. The optical interconnection assembly according to claim 5, wherein:
   a) the first data rate is 120 GbE and the second data rate is 40 GbE; or
   b) the first data rate is 400 GbE and the second data rate is 100 GbE.

7. The optical interconnection assembly according to claim 5, wherein the first and second data rates are each 40 GbE.

8. A spine-and-leaf (S/F) network having scale-out capability that maintains multifiber connections, comprising one or more spine switches, each having one or more spine MF components, one or more leaf switches, each having one or more leaf MF components, at least one optical interconnection assembly having a first plurality of Ms spine MF components optically connected to the one or more spine MF components via one or more spine patch cords, and having a second plurality of ML leaf-side MF components optically connected to the one or more leaf MF components via one or more leaf patch cords, the at least one optical interconnection assembly further comprising an array of duplex fiber optic cables that optically connect at least one spine MF component of each spine switch to at least one leaf MF component of each leaf switch so that every spine switch is optically connected to every leaf switch; wherein each spine-side MF component has Ns parallel channels and a bandwidth $BW_S$, each leaf-side MF component has $N_L$ parallel channels and a bandwidth $BW_L$, each duplex optical fiber has a data rate D, and $BW_S = N_S \cdot D$ and $BW_L = N_L \cdot D$, so that $N_S/N_L = M_L/M_S$.

9. The S/F network according to claim 8, wherein $M_S \cdot BW_S = M_L \cdot BW_L$.

10. The S/F network according to claim 8, further including a housing having an interior that contains the array of duplex fiber optic cables.

11. The S/F network according to claim 10, wherein the housing comprises a modular housing having a first side that supports the plurality of spine MF components and a second side that supports the plurality of leaf MF components.

12. The S/F network according to claim 8, wherein each of the spine MF components has a first data rate and wherein each of the leaf MF components has a second data rate.

13. The S/F network according to claim 8, wherein:
   a) the first data rate is 120 GbE and the second data rate is 40 GbE; or
   b) the first data rate is 400 GbE and the second data rate is 100 GbE.

14. The S/F network according to claim 8, wherein the first and second data rates are each 40 GbE.

15. A method of forming a spine-and-leaf (S/F) network using a plurality of spine switches and a plurality of leaf switches, comprising providing a least one optical interconnection assembly having a plurality of MS spine MF components and a plurality of ML leaf MF components, wherein each spine MF component is optically connected to each leaf MF component via an array of duplex fiber optic cables, and optically connecting each of the plurality of spine switches to one or more of the spine MF components of the at least one optical interconnection assembly and optically connecting each of the plurality of leaf switches to one or more of the leaf MF components of the at least one optical interconnection assembly so that each leaf switch is optically connected to each spine switch through the at least one optical interconnection assembly; wherein each spine MF component has $N_S$ parallel channels and a bandwidth $BW_S$, each leaf MF component has $N_L$ parallel channels and a bandwidth $BW_L$, each duplex fiber optic cable has a data rate D, and wherein $BW_S = N_S \cdot D$ and $BW_L = N_L \cdot D$, so that $N_S/N_L = M_L/M_S$.

16. The method according to claim 15, wherein said optically connecting the plurality of spine switches to the one or more of the spine MF components of the at least one optical interconnection assembly is performed using a first plurality of spine patch cords in a first configuration, and further comprising:
   adding one or more spine switches to the S/F network by adding a second plurality of spine patch cords and re-arranging the first plurality of patch cords to define a second configuration.

17. The method according to claim 15, wherein $M_S \cdot BWs = M_L \cdot BW_L$.

18. The method according to claim 15, further comprising scaling out the S/F network by operably adding optical interconnection assemblies to the S/F network.

* * * * *